United States Patent [19]

Lupoli et al.

[11] Patent Number: 4,544,226

[45] Date of Patent: Oct. 1, 1985

[54] TWO-PIECE CLAMP SHELL FOR ELECTRIC CIGAR LIGHTER

[75] Inventors: Peter J. Lupoli, Hamden; John J. Comerford, Stamford, both of Conn.

[73] Assignee: Casco Products Corporation, Bridgeport, Conn.

[21] Appl. No.: 597,833

[22] Filed: Apr. 9, 1984

[51] Int. Cl.⁴ ............................................. H01R 13/74
[52] U.S. Cl. .................................. 339/130 R; 219/267
[58] Field of Search ............... 219/260, 262, 263, 264, 219/265, 266, 267, 268, 269, 270; 339/129, 130 R, 130 C

[56] References Cited

U.S. PATENT DOCUMENTS

| | | | |
|---|---|---|---|
| 1,565,313 | 12/1925 | Douglas | 339/130 R |
| 2,180,711 | 11/1939 | Lehmann | 219/267 |
| 3,341,687 | 9/1967 | Horwitt et al. | 219/264 |
| 3,975,619 | 8/1976 | Uda | 219/267 |

*Primary Examiner*—John McQuade
*Attorney, Agent, or Firm*—Cynthia Berlow; Mitchell D. Bittman

[57] ABSTRACT

A two-piece clamp shell for an automotive electric cigar lighter of the type that includes a socket carried in a panel or other support surface of the vehicle and has a threaded inner end receiving energy through a snap-on fitting connected to the vehicle's electrical system. The clamp shell comprises a two-piece assemblage which can be applied to the socket from the underside of the panel, to secure the same in place. It includes a tubular, encircling body part and a nut part. The body part has a forward edge portion which engages the rear face of the support surface, and a rear edge portion which is engaged by the nut part, the latter having a thread mating with the socket thread, and abutments disposed forward of the thread. The rear edge of the body part is engaged by the abutments on the nut part during the clamping. A continuous forwardly-facing shoulder on the nut part provides a retainer lip over which the vehicle's snap-on electrical fitting can be forced regardless of the rotative position of said part. The nut part permits circumferential alignment of the body part with respect to the socket, for lighting requirements. Also, the nut part can be employed with body parts having different axial lengths to accommodate different support surfaces.

18 Claims, 13 Drawing Figures

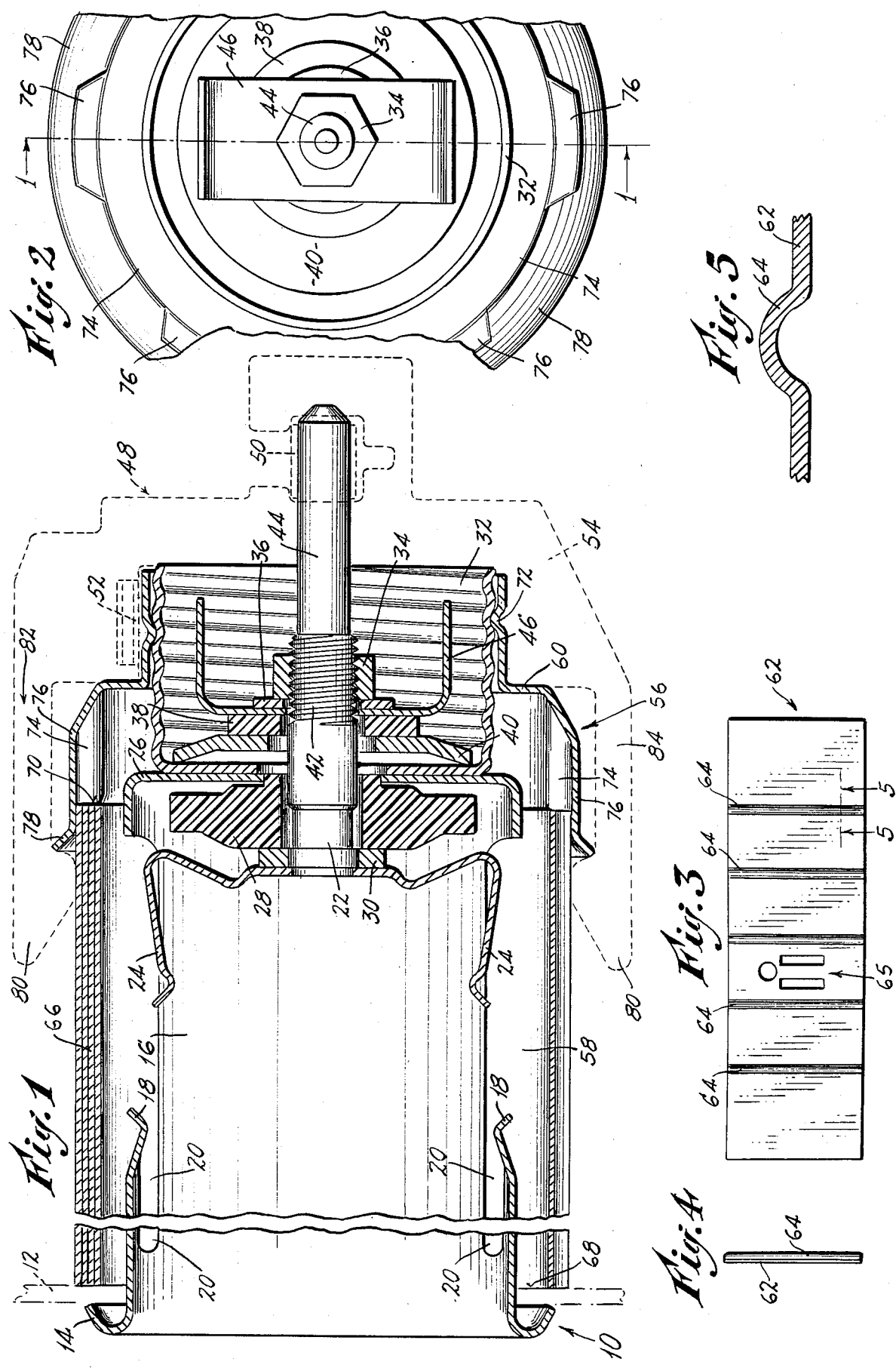

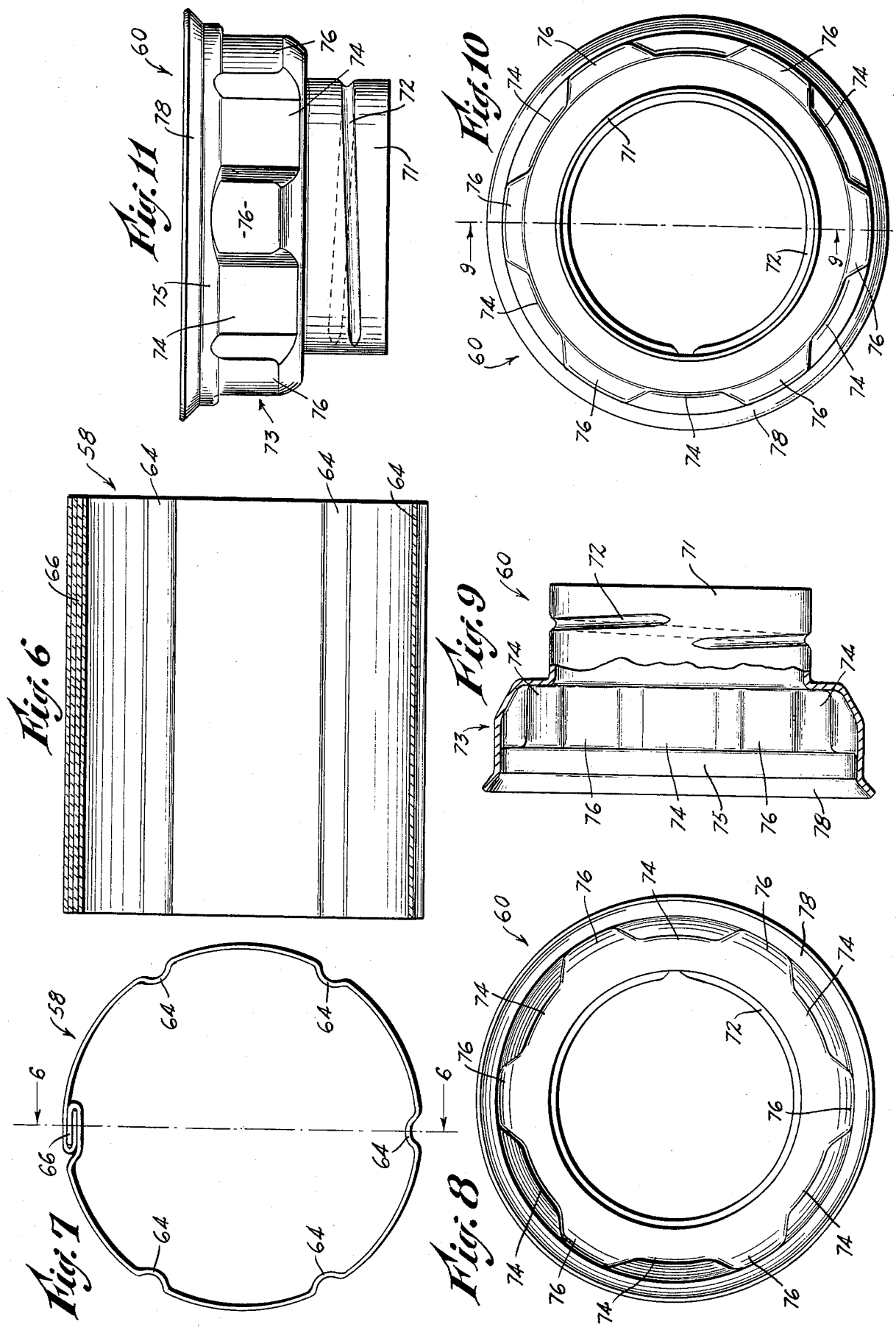

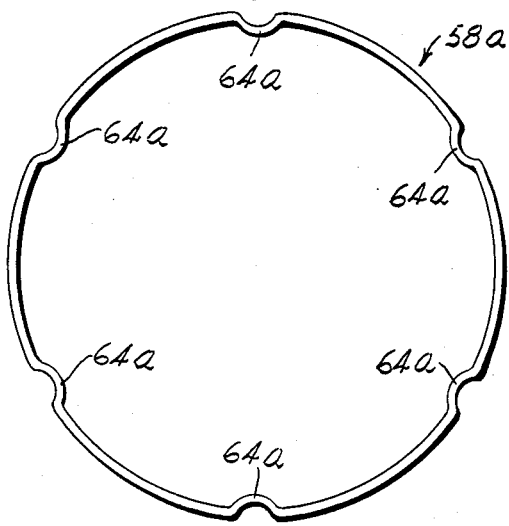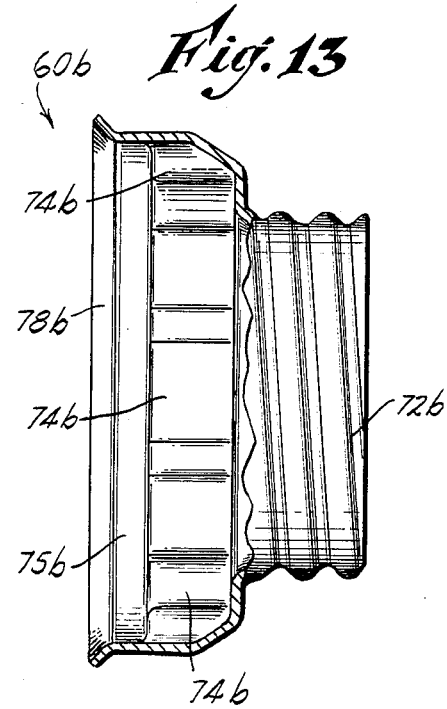

TWO-PIECE CLAMP SHELL FOR ELECTRIC CIGAR LIGHTER

CROSS REFERENCE TO RELATED APPLICATIONS

Copending application U.S. Ser. No. 497,094 filed May 23, 1983, entitled MULTI-PIECE CLAMPING SHELL FOR ELECTRIC CIGAR LIGHTERS, in the names of Peter J. Lupoli and John J. Comerford.

BACKGROUND

This invention relates generally to clamp shells for mounting electric cigar lighters in panels or other support surfaces of automobiles, and more particularly to improvements relating to constructions disclosed and claimed in the U.S. application Ser. No. 497,094 identified above.

Electric cigar lighters are generally inserted in a panel such as an automobile dashboard from the front, and secured at the rear by installation of a tubular clamp shell which fits over the body of the lighter, and which has a threaded end that is screwed onto a cooperable thread formation at the inner end of the lighter socket. The socket usually has an annular flange or curl at its front, which surrounds the opening in the panel. In the past, these clamp shells were made as a single drawn sheet metal piece, with the threads being formed following the drawing operation, in a thread-rolling machine. The front of the shell was adapted to engage the rear surface of the dashboard, and the shell was tightened until the dashboard was firmly sandwiched between the shell and the curl of the socket.

While such an arrangement has found wide acceptance in the industry, a number of refinements have been made over the years in order to achieve lowered manufacturing cost through the use of less expensive parts, and reduced labor. In addition, the designs previously employed had to be modified somewhat as a result of changes in the requirements dictated by the construction of the newer model vehicles. For example, many of the panels that carry electric cigar lighters are now constituted of plastic, which generally must be somewhat thicker than the prior metal dashboards, this necessitating modification of the dimensions of the various parts. Also, due to a vastly increased number of options being supplied on the typical vehicle, as well as reductions in the available space that each system could occupy, there arose problems with accessibility to the various components, especially those in the engine compartment, and those located beneath the dashboard or instrument panel. In some instances the available space was insufficient to accommodate the older types of lighters and connectors or fixtures. In spite of the restrictions in the allowable space, care had to be exercised in order to insure that the various parts could be installed without difficulty. The same was true where repair or replacement of particular components or assemblies was involved. Newer electrical snap-on fittings that facilitated wiring could not be accommodated in prior lighter structures, due to existing clamp arrangements.

SUMMARY

The above disadvantages and drawbacks of prior cigar lighter clamp shells are obviated by the present invention, which has for one object the provision of a novel and improved two-piece current-conducting clamp shell for lighters wherein the nut part, regardless of its rotative position or orientation, securely retains against dislodgement a snap-on type electrical fitting of the vehicle electrical system.

Another object of the invention is to provide an improved current-conducting clamp shell as above set forth, which is both simple in construction and economical to manufacture.

A related object of the invention is to provide an improved two-piece current-conducting clamp shell in accordance with the foregoing, which can be produced from substantially flat metal stock and formed into the desired shape by automated equipment, and in part through simple metal drawing operations.

Still another object of the invention is to provide an improved clamp shell as above characterized, wherein the shell body part can be adjustably positioned with respect to the cigar lighter socket, in order that a miniature 12-volt bulb and socket fixture carried thereby can align with an opening in the lighter socket so as to permit the socket interior to be illuminated; this facilitates restoring of the ignitor plug in the socket by the ultimate user, as under conditions of dim ambient lighting or darkness.

Yet another object of the invention is to provide an improved two-part, current-conducting clamp shell of the kind indicated, wherein a simple, yet positive retention of the snap-on current-carrying fitting of the vehicle electrical system is had, by the provision of a novel continuous shoulder that is carried on the nut part of the shell.

A still further object of the invention is to provide an improved clamp shell as outlined above, wherein an especially compact assemblage can be realized through use of a physically small current-carrying snap-on fitting which is quickly and easily assembled to the socket base, and which occupies a minimum of space immediately to the rear thereof, thus making such space available for other equipment or components.

Yet another object of the invention is to provide an improved two-part clamp shell of the type indicated, which can be readily adapted for use with panels of different thickness, and wherein the overall length of the shell can be varied merely by substitution of a different tubular body part of slightly modified axial length.

The above objects are accomplished by the provision of the unique two-piece electrically-conducting clamp shell as below described, for use with an electric cigar lighter of the type which is carried on a support surface of an automobile and which has a socket with a threaded inner end adapted to be connected with a current-carrying snap-on fitting of the vehicle's electrical system. Such fittings are of the type having clip means engageable with the clamp shell to hold the fitting in position when snapped onto the cigar lighter socket. The clamp shell comprises generally a tubular body part surrounding the cigar lighter socket, having a forward edge portion which engages the rear face of the support surface that carries, the lighter, and having a rear abutment edge portion. A unique nut part is provided for cooperation with the body part, said nut part. having a thread engageable with the threaded end of the lighter socket. The nut part has abutments forward of the thread, engageable with at least portions of the rear edge of the body part when the nut part is threaded on the socket, thereby to apply pressure to said rear edge portion. Means are provided on the nut part, defining a forwardly-facing shoulder for engagement by the snap-on clip means of the current-carrying fitting associated with the socket, to retain the fitting against axial dislodgement. The arrangement is such that the body part can be adjustably rotated with respect to the cigar lighter socket prior to tightening of the nut part, so as to permit alignment of a miniature 12-volt bulb and socket fixture or assembly carried on the shell, with apertures in the lighter socket so as to illuminate the latter and facilitate replacement of the ignitor plug under dark conditions. In addition, tubular body parts of varying axial length can be substituted for one another, in order to accommodate slightly different thicknesses in dashboards, mounting bezels, etc. Also, with the shoulder being located on the nut part, physically small electrical snap-on fittings can be employed. As a result, maximum utilization is made of the available space, and installation and/or repair of the lighter and adjacent components is simplified.

Other features and advantages will hereinafter appear.

In the drawings, illustrating several embodiments of the invention:

FIG. 1 is an axial section of the improved clamp shell of the present invention, shown installed on a cigar lighter socket of generally conventional construction, and illustrating the tubular body and nut parts of the shell. The section is taken on the line 1—1 of FIG. 2.

FIG. 2 is a fragmentary right end elevation of the socket and shell of FIG. 1.

FIG. 3 is a top plan view of a rectangular blank of sheet metal material from which the tubular shell body part can be constructed, this view illustrating a series of ribs that have been imparted to the blank prior to its having been formed into a cylindrical shape.

FIG. 4 is a left end elevation of the blank of FIG. 3.

FIG. 5 is a fragmentary section taken on the line 5—5 of FIG. 3.

FIG. 6 is a diametric section of the body part of the shell, following the formation of the blank of FIG. 3 into a cylindrical shape, and wherein the adjacent longitudina edges thereof have been secured together by forming a reverse-bend clinched seam. The section is taken on the line 6—6 of FIG. 7.

FIG. 7 is a left end elevation of the body part of the shell of FIG. 6, particularly showing the seam.

FIG. 8 is a left end elevation of the nut part of the clamp shell of FIGS. 1 and 2.

FIG. 9 is a view, partly in elevation and partly in diametric section, of the nut part of FIG. 8. The section is taken on line 9—9 of FIG. 10.

FIG. 10 is a right end elevation of the nut part of FIGS. 8 and 9.

FIG. 11 is a side elevation of the nut part of FIGS. 8-10, from another view point which is 90° displaced from that of FIG. 9.

FIG. 12 is a view like that of FIG. 7, of a modified body part, constituted as a drawn metal tube, constituting another embodiment of the invention.

FIG. 13 is a view like that of FIG. 9, of a modified nut part, incorporating a multi-turn thread, constituting yet another embodiment of the invention.

Referring first to FIG. 1 there is illustrated, in axial section, a cigar lighter socket generally designated by the numeral 10, carried in an aperture of a panel or other support surface such as an automobile dashboard 12. The socket has an out-turned flange or curl 14 in engagement with the front surface of the panel 12, all in the usual manner, and has a side wall 16 with lanced spring fingers 18 which cooperate with shoulders on an ignitor plug (not shown) in order to position the latter properly within the socket.

On opposite sides of the fingers 18 are slots or cutouts 20 which function to provide resilience and also ventilation to the interior of the socket, and in addition enable light from a miniature 12-volt bulb and socket fixture or assembly (not illustrated) to enter the interior and facilitate replacement of the ignitor plug under conditions of darkness.

At the base of the socket 10 is a current-carrying stud 22 having the usual bimetal latching fingers 24 welded thereto, said fingers being adapted to latch over the heating element cup (not shown) of an ignitor plug when the latter is depressed in the socket. The stud 22 is insulated from the transverse wall 26 of the socket by an insulating bushing 28, and a spacer member 30 is welded to the stud 22 for offsetting the fingers 24 for freedom of movement.

On the inner end of the socket 10 is a threaded cup 32 that is held against the wall 26 by a nut 34, metal washer 36, insulating washer 38 and cupped washer 40. The stud 22 has a threaded portion 42 which carries the nut 34, and a smooth end or extension 44. A U-shaped bimetal strip 46 is provided between the washers 36 and 38, being electrically connected to the hot side of the circuit which is represented by the stud 22. The bimetal strip 46 has the position shown when the socket or base area is relatively cool, but the legs of the strip 46 can expand in a radially outward direction in the event that overheating occurs, that is, in case the bimetal fingers 24 do not release the ignitor plug. Eventually, when sufficient heat is developed, they touch the inner surface of the cup 32 to short circuit the lighter and intentionally blow the fuse in the vehicle electrical system; this prevents possible damage or fire in the area around the socket and the associated wiring harness.

As shown, the stud 22 passes through aligned holes in the socket wall 26, and in the transverse wall of the cup 32, so as to be electrically insulated therefrom.

Electrical connection to the vehicle's wiring is made through a snap-on electrical fitting 48 having a first contact in the form of a leaf spring 50 that is adapted to fit over the smooth part 44 of the stud 22, and a second contact also in the form of a spring 52 having a flat area or surface intended to engage the outer surface of a current-conducting clamp shell to be described below. The contacts 50 and 52 are held captive in a molded plastic housing 54 which has electrical leads (not shown) extending to the vehicle's battery through suitable fusing, etc. The snap-on electrical fitting 48 forms no part of the present invention, and further details thereof are accordingly not given herein.

In accordance with the present invention there is provided a novel and improved, two-piece clamp shell 56 for securing the cigar lighter socket at the rear of the panel 12, said shell being both physically small in size, and especially adaptable in use such that the space occupied by the lighter and fitting 48 can be minimized while at the same time a positive and reliable electrical connection is established between the socket and the fitting 48. In accomplishing the above object, the clamp shell 56, constituted as two pieces, comprises a tubular body part 58 particularly illustrated in FIGS. 6 and 7, and a unique nut part 60 shown in FIGS. 8-11.

The body part 58 is preferably constituted of sheet metal, and can be formed as a blank 62 from flat sheet metal stock, as in FIGS. 3 and 4. The blank 62 has a series of longitudinal stiffening ribs 64 imparted to it, preferably at the time as the blanking operation occurs. Also, apertures 65 can be formed at this time, for retaining a miniature 12-volt bulb and socket assembly (not shown) which is of conventional construction and is used to illuminate the socket interior. The rectangular-shaped apertures are employed to receive spring fingers of a bulb housing (not shown), and the circular aperture is for light transmission. The arrangement is such that the filament of the bulb overlies the circular aperture to permit light to enter the area around the socket. Since the bulb housing and bulb by themselves form no part of the present invention, further description is omitted. In addition, the apertures 65 have been omitted from the remaining figures of the drawings, for clarity. A bulb and socket assembly of this general type is shown in the copending application above identified.

A cross-sectional view of one of the ribs 64 is shown in FIG. 5. Following blanking, the body part 58 is rolled, preferably by automated equipment (not shown) into a cylindrical shape as in FIGS. 6 and 7, and the longitudinal edges thereof joined together by means of a reverse-bend clinched seam 66, FIG. 7. The body part 58 has a forward edge 68 which is adapted to engage the rear face of the panel 12 as in FIG. 1, and a rear edge 70 which is engageable with abutments of the nut part 60 now to be described.

As seen in FIGS. 8-11, the nut part 60 comprises a drawn sheet metal member in the form of a sleeve 71 containing a thread 72 which may be a single helical turn extending through an angle of roughly 360°. The intermediate portion 73 of the nut part 60 has a transverse cross section of wavelike configuration, FIGS. 8 and 10, formed by indents providing a plurality of circumferentially spaced inward abutments or projections 74 which extend radially inward as viewed in FIGS. 8 and 10, and which engage the rear edge 70 of the body part 58 and apply pressure thereto when the nut part is screwed onto the socket, as in FIG. 1. The nut part 60 also has a cylindrical portion 75 with an inner diameter that is just slightly greater than the outer diameter of the body part 58, such that the two parts can telescope as in FIG. 1 until the edge 70 of the body part seats against the projections 74. The wavelike cross section also gives rise to external projections 76, FIGS. 10 and 11, for engagement by a wrench, pliers or other tool.

By the present invention, the forward edge of the nut part 60 has a continuous, forwardly-facing conical or flared shoulder 78 which extends completely around the periphery of the nut part and radially outward beyond outer surface portions of the body part, as in FIG. 1. This flared shoulder is adapted to cooperate with corresponding lugs or abutment surfaces 80, also later referred to as a "clip means", on the snap-on electrical fitting 48, as shown in FIG. 1, such that the latter can be snapped in place from the rear of the socket of the cigar lighter and retained therein with the lugs 80 latched ove the flared flange 78 regardless of the rotative position or orientation of the nut part 60. The shoulder 78 also constitutes a lead-in formation for assembly of the nut and body parts.

In the preferred embodiment, the lugs 80 are disposed near the ends of a pair of oppositely disposed legs 82, 84 of the snap-on fitting 48, such legs being of molded plastic substance and having a resiliency which permits them to spread apart somewhat in order to by-pass the shoulder 78. The resilience of the legs 82, 84 is such that once they pass the shoulder they spring radially inward so as to firmly retain the fitting against inadvertent axial dislodgement. During the installation of the fitting, the leaf spring 50 slides over the smooth portion 44 of the stud 22, and the spring 52 similarly slides over the exterior surface of the nut part 60, adjacent its thread 72.

Prior to installation of the snap-on fitting 48, and just before the nut part 60 is tightened, the body part 58 can be turnably adjusted independently of the nut part and socket so that the circular one of the openings 65 aligns with one of the cut-outs or slots 20 in the socket wall 16; thus, when a miniature 12-volt bulb and socket assembly is carried on the body part 58 of the shell, the socket interior will be illuminated, to facilitate replacement of the ignitor plug under conditions of darkness.

Another embodiment of the invention is shown in FIG. 12, wherein a simple drawn sheet metal shell 58a is adapted to be substituted for the body part 58 shown in FIGS. 6 and 7. This modification of the body part is similar in other respects, and preferably has a series of longitudinally extending ribs 64a for strength or stiffening.

Still another embodiment of the invention is shown in FIG. 13, wherein the nut part indicated 60b has abutments or projections 74b, a cylindrical portion 75b adapted to telescope with the body part 58 of FIGS. 6 and 7, or alternately with the body part 58a of FIG. 12, and a flared shoulder 78b. In place of the single thread 72 of FIGS. 8-11, a thread 72b having multiple convolutions is shown. This arrangement would not provide as smooth an exterior surface as that of the nut part 60 of the prior construction, but can have utility for certain applications. In all likelihood, cost considerations involving manufacturing steps and available tooling would dictate which arrangement would be preferred for a particular installation.

From the above it can be seen that we have provided a novel and improved two-part clamp shell adapted to readily accommodate and retain a cooperable snap-on electrical fitting regardless of the final rotative position of the nut part. The clamp shell is extremely simple in its structure, and has the advantage of low cost, straightforward assembly, and adaptability to various installations involving slightly different panel thicknesses. There is also maintained the ability to adjust the angular position of the body part of the shell with respect to the socket, which is important when it is desired to orient a bulb on the shell with the openings in the side walls of the lighter socket. The device is both physically small, rugged, and capable of reliable operation over extended periods of use.

Each and every one of the appended claims defines an aspect of the invention which is separate and distinct from all others, and accordingly each claim is to be treated in this manner when examined in the light of the prior art devices in any determination of novelty or validity.

Variations and modifications are possible without departing from the spirit of the claims.

What is claimed is:

1. A two-piece electrically-conducting clamp shell for an electric cigar lighter of the type carried in a support surface of an automotive vehicle and having a socket with a threaded inner end, and adapted to be connected with a current-carrying snap-on fitting of the vehicle's electrical system, said fitting being of the type having clip means for holding the fitting in position when snapped onto the cigar lighter socket, said clamp shell comprising, in combination:
  (a) a tubular body generally surrounding the cigar lighter socket and having a forward edge portion adapted to engage the rear face of the support surface that carries the lighter,
  (b) said body having a rear edge portion,
  (c) an electrically-conducting nut having a thread engageable with the threaded inner end of the cigar lighter socket,
  (d) said nut having an abutment forward of the thread and engageable with at least parts of the rear edge portion of the tubular body when the nut is threaded on the socket, thereby to apply pressure to the said rear edge portion, and
  (e) means on the nut providing a continuous, forwardly-facing shoulder, any selected peripherally-spaced portions of which are adapted for engagement by the clip means of the current-carrying fitting associated with the socket for the purpose of retaining said fitting against axial dislodgement, whereby the rotative position of the nut is immaterial as regards the retention of said fitting thereon.

2. The invention as set forth in claim 1, wherein:
  (a) said shoulder-providing means on the nut comprises a conical ledge disposed at the extreme forward edge of the nut,
  (b) said ledge at all points extending radially outward beyond outer surface portions of the tubular body of the clamp shell.

3. The invention as set forth in claim 1, wherein:
  (a) the shoulder-providing means of the nut is integral with the other portions thereof.

4. The invention as set forth in claim 1, wherein:
  (a) the nut is constituted as a drawn metal shell.

5. The invention as set forth in claim 1, wherein:
  (a) said nut has an annular wall,
  (b) the said abutment comprising a plurality of inwardly extending projections in the said annular wall, engageable with the said rear edge portion of the tubular body.

6. The invention as set forth in claim 1, wherein:
  (a) said nut has an annular wall portion characterized by a wavelike transverse cross section,
  (b) said wavelike transverse cross section defining the abutment of said nut, and defining external lugs adapted for engagement by a suitable tool, for facilitating tightening of the nut onto the threaded inner end of the cigar lighter socket.

7. The invention as set forth in claim 1, wherein:
  (a) said nut is characterized by a single thread extending through an angle on the order of 360°.

8. The invention as set forth in claim 1, wherein:
  (a) the threaded portion of the nut has an expansive outer cylindrical surface,
  (b) said fitting comprising a leaf spring having a generally flat surface engageable with the expansive outer surface of the threaded portion of the nut, so as to maximize the area of electrical contact between the spring and nut.

9. The invention as set forth in claim 1, wherein:
  (a) the tubular body is of generally cylindrical configuration, characterized by a given outer diameter,
  (b) said nut having a portion adjacent its shoulder, of generally similar cylindrical configuration and characterized by an inner diameter slightly greater than that of the outer diameter of the body to enable the nut to telescopically receive the body.

10. The invention as set forth in claim 1, wherein:
  (a) said shoulder-providing means on the nut comprises a conical ledge disposed at the forward edge of the nut,
  (b) said ledge constituting a lead-in for the rear edge portion of the tubular body when the nut is initially assembled thereto.

11. The invention as set forth in claim 1, wherein:
  (a) said tubular body has a plurality of longitudinal stiffening ribs extending for substantially its entire length.

12. The invention as set forth in claim 1, wherein:
  (a) said tubular body is constituted of a single piece of sheet metal, rolled into a cylindrical shape, and having its adjacent longitudinal edges crimped together into a tight seam characterized by reverse-bends.

13. The invention as set forth in claim 1, wherein:
  (a) the tubular body is rotatable independently of the nut when the latter is loose on the socket, to permit a predetermined angular alignment of the body with respect to the socket prior to tightening of the nut.

14. The invention as set forth in claim 1, wherein:
  (a) the means on the nut, which provides a forwardly-facing shoulder, comprises a circular flared edge thereon.

15. The invention as set forth in claim 1, wherein:
  (a) said nut thread comprises several convolutions.

16. The invention as set forth in claim 1, wherein:
  (a) said abutment comprises a plurality of inwardly extending projections on the annular wall of the nut, said projections being spaced circumferentially from one another about the wall.

17. The invention as set forth in claim 1, wherein:
  (a) the nut has an annular wall,
  (b) said abutment comprising projections in said annular wall, extending radially inward of other portions of said wall,
  (c) the rear edge portion of the body being telescopically received in said annular wall and engaging said projections when the nut is tightened on the socket.

18. A two-piece electrically conducting clamp shell for an electric cigar lighter of the type carried in a support surface of an automotive vehicle and having a socket with a threaded inner end, said clamp shell comprising, in combination:
  (a) a tubular body generally surrounding the cigar lighter socket and having a forward edge portion adapted to engage the rear face of the support surface that carries the lighter,
  (b) said body having a rear edge portion,
  (c) a nut having a thread engageable with the threaded inner end of the cigar lighter socket,
  (d) said nut having an abutment shoulder and an annular wall whose inner diameter is just greater than the outer diameter of the tubular body such that the rear edge portion of the latter can be telescopically received in the nut when it is screwed onto the socket, whereby the tubular body is clamped between the rear face of the support surface and the abutment shoulder of the nut to hold the lighter socket in position beneath the said support surface.
  (e) said nut having a conical guide surface disposed at its forward edge, the larger portion of said guide surface extending toward the forward edge portion of the body,
  (f) said conical guide surface providing a lead-in formation to guide the nut onto, and enable the annular wall thereof to telescope over, the body when the nut is assembled to the socket.

* * * * *